United States Patent
Schacht et al.

(10) Patent No.: US 10,264,033 B2
(45) Date of Patent: Apr. 16, 2019

(54) SELECTIVELY PROVIDING CONTENT ON A SOCIAL NETWORKING SYSTEM

(71) Applicant: Facebook, Inc., Menlo Park, CA (US)

(72) Inventors: Keith Schacht, San Francisco, CA (US); Francis Luu, San Francisco, CA (US); Lars Seren Backstrom, San Francisco, CA (US); Mark Tonkelowitz, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 861 days.

(21) Appl. No.: 14/800,605

(22) Filed: Jul. 15, 2015

(65) Prior Publication Data

US 2015/0317287 A1 Nov. 5, 2015

Related U.S. Application Data

(62) Division of application No. 13/421,786, filed on Mar. 15, 2012, now Pat. No. 9,117,249.

(51) Int. Cl.

| | |
|---|---|
| *G06F 15/16* | (2006.01) |
| *H04L 29/06* | (2006.01) |
| *H04L 29/08* | (2006.01) |
| *H04L 12/58* | (2006.01) |
| *G06F 17/22* | (2006.01) |
| *G06N 5/02* | (2006.01) |
| *G06F 16/248* | (2019.01) |
| *G06F 16/2457* | (2019.01) |
| *G06Q 50/00* | (2012.01) |
| *G06Q 10/10* | (2012.01) |

(52) U.S. Cl.
CPC .......... *H04L 65/403* (2013.01); *G06F 16/248* (2019.01); *G06F 16/24578* (2019.01); *G06F 17/2235* (2013.01); *G06N 5/022* (2013.01); *G06Q 10/10* (2013.01); *G06Q 50/01* (2013.01); *H04L 51/32* (2013.01); *H04L 67/1095* (2013.01); *H04L 67/22* (2013.01)

(58) Field of Classification Search
USPC .......................................................... 709/204
See application file for complete search history.

(56) References Cited

U.S. PATENT DOCUMENTS

| | | |
|---|---|---|
| 7,822,812 B2 | 10/2010 | Mathur et al. |
| 7,827,234 B2 | 11/2010 | Eisenberger et al. |
| 7,899,862 B2 | 3/2011 | Appelman et al. |
| (Continued) | | |

OTHER PUBLICATIONS

United States Office Action, U.S. Appl. No. 14/792,531, dated Mar. 30, 2016, thirteen pages.

(Continued)

*Primary Examiner* — Hee Soo Kim
(74) *Attorney, Agent, or Firm* — Fenwick & West LLP

(57) ABSTRACT

News feed stories are ranked so that new stories appear above previously viewed stories for users of a social networking system. Top news stories are selected by the social networking system based on a ranking algorithm that incorporates an analysis of affinities for interests, users, and entities in the social networking system based on user interactions. Other new stories are provided after the top new stories in a chronological order. For each user of the social networking system, a view state is recorded that includes the order of news feed stories provided to users. Based on the view state and received user input, the social networking system may determine whether to provide new news feed stories to a viewing user.

20 Claims, 6 Drawing Sheets

(56) References Cited

U.S. PATENT DOCUMENTS

| | | |
|---|---|---|
| 2008/0040673 A1 | 2/2008 | Zuckerberg et al. |
| 2008/0071929 A1 | 3/2008 | Motte et al. |
| 2008/0082941 A1 | 4/2008 | Goldberg et al. |
| 2008/0176655 A1 | 7/2008 | James et al. |
| 2011/0202852 A1 | 8/2011 | Jeong et al. |
| 2012/0042012 A1 | 2/2012 | Darnell et al. |
| 2012/0215846 A1 | 8/2012 | Howes et al. |

OTHER PUBLICATIONS

United States Office Action, U.S. Appl. No. 14/792,531, dated Jun. 2, 2017, nine pages.
United States Advisory Action, U.S. Appl. No. 13/421,786, dated Apr. 15, 2015, four pages.
United States Office Action, U.S. Appl. No. 13/421,786, dated Dec. 29, 2014, eleven pages.
United States Office Action, U.S. Appl. No. 13/421,786, dated Aug. 7, 2014, eleven pages.
United States Office Action, U.S. Appl. No. 13/421,786, dated Mar. 17, 2014, seven pages.
United States Office Action, U.S. Appl. No. 14/792,531, dated Nov. 8, 2016, nine pages.
United States Office Action, U.S. Appl. No. 14/792,531, dated May 16, 2018, nine pages.

SELECTIVELY PROVIDING CONTENT ON A SOCIAL NETWORKING SYSTEM

CROSS REFERENCE TO RELATED APPLICATIONS

This application is a divisional of co-pending U.S. application Ser. No. 13/421,786, filed Mar. 15, 2012, now allowed, which is incorporated by reference in its entirety.

BACKGROUND

This invention relates generally to social networking, and in particular to selectively providing content on a social networking system.

In recent years, users of social networking systems have shared their interests and engaged with other users of the social networking systems by sharing photos, real-time status updates, and playing social games. The amount of information gathered from users is staggering—information describing a variety of "newsworthy" items, including recent moves to a new city, graduations, births, engagements, marriages, and the like, as well as more mundane content such as status messages, information about what music has been listened to by users, and recent check-in events at coffee shops. As users become more connected with other users and entities on the social networking system, the number of content items provided to the users increases exponentially. Existing social networking systems have ordered content items in reverse chronological order such that newly published content is displayed first. However, as a result of a flood of content items published on social networking systems, users may be exposed to irrelevant and uninteresting content while missing more relevant content that was previously presented.

Social networking systems may rank content items based on user interests and affinities for other users, but providing a continuous and chronological stream of content to users may effectively obscure more interesting and relevant content items among less interesting content items that have been more recently published. Because users may load a page of a social networking system without reading content items provided on the page, interesting and relevant content items may never be seen by the users. As a result of a decline in the user experience, users may become less engaged with the social networking system.

Specifically, users of social networking systems do not have an effective tool to indicate whether content items have been read or otherwise consumed. Providing users with efficient methods of consuming content items on a social networking system is valuable in providing a better user experience for users. As a result of consumption of content items, highly targeted contextual advertising may further provide valuable advertising revenue to the social networking system. However, existing systems have not provided users with tools or methods of managing the consumption of numerous incoming content items.

SUMMARY

News feed stories are ranked so that new stories appear above previously viewed stories for users of a social networking system. Top news stories are selected by the social networking system based on a ranking algorithm that incorporates an analysis of affinities for interests, users, and entities in the social networking system based on user interactions. Other new stories are provided after the top new stories in chronological order. For each user of the social networking system, a view state is recorded that includes the order of news feed stories provided to users. Based on the view state and received user input, the social networking system may determine whether to provide new news feed stories to a viewing user.

Figure 1:
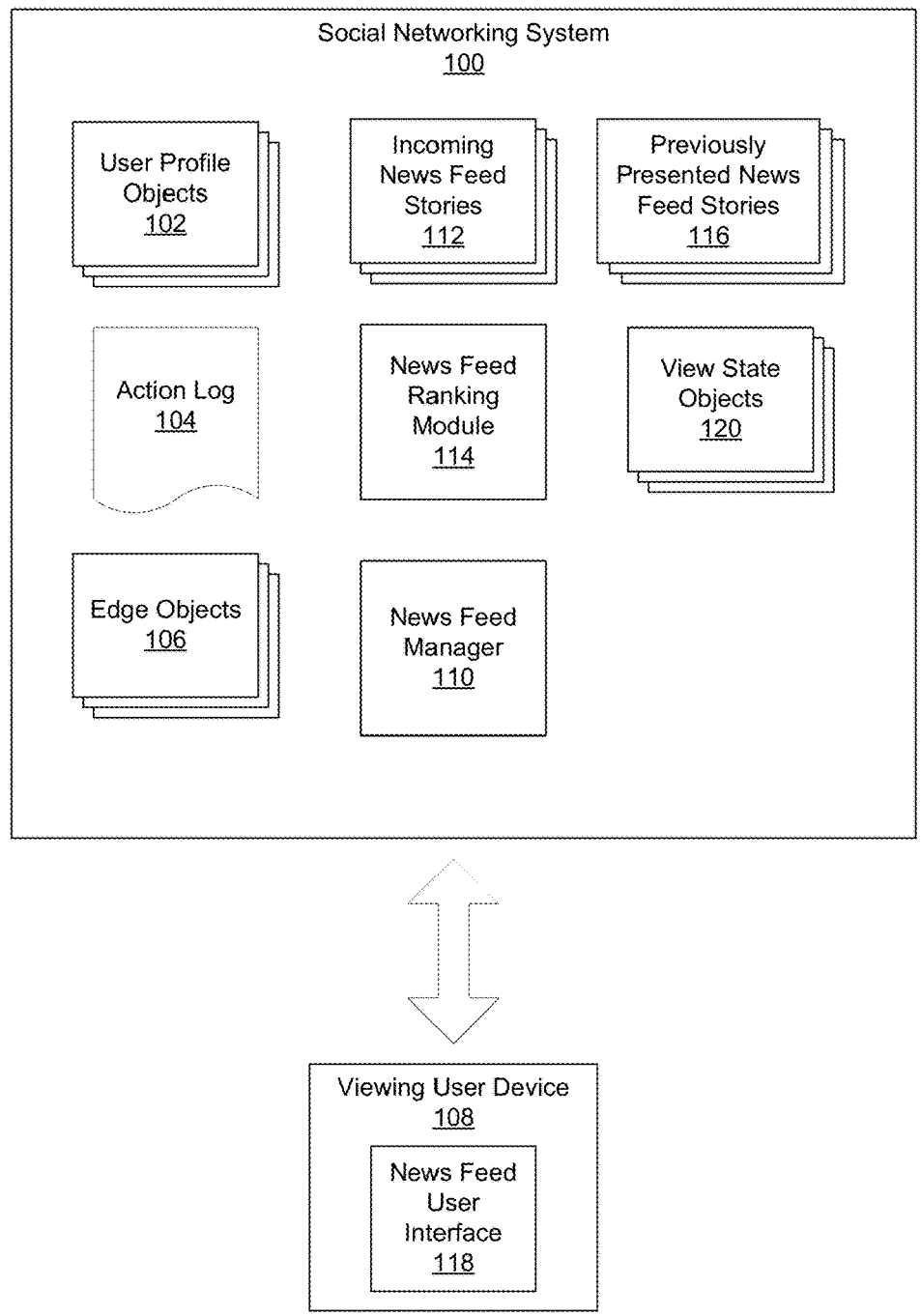
FIG. 1 is high level block diagram illustrating a process of selectively providing content in a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user.

In addition to declarative information provided by users, social networking systems may also record users' actions on the social networking system. These actions include communications with other users, sharing photos, interactions with applications that operate on the social networking system, such as a social gaming application, responding to a poll, adding an interest, and joining an employee network. A social networking system may also be able to capture external website data that is accessed by its users. This external website data may include websites that are frequently visited, links that are selected, and other browsing data. Information about users, such as stronger interests in particular users and applications than others based on their behavior, can be generated from these recorded actions through analysis and machine learning by the social networking system.

A social networking system may also attempt to infer information about its users. A social networking system may analyze posted content by users that include keywords, such as "wedding." Location information may be gathered from content items posted by users to infer a home location of the user. As a result, a social networking system may infer certain profile attributes of a user, such as geographic location, educational institutions attended, and age range, by analyzing the user's connections and their declared profile information. Inferring profile attributes are further discussed in "Inferring User Profile Information," U.S. application Ser. No. 12/916,322, filed on Oct. 29, 2010, which is hereby incorporated by reference.

A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests. In one embodiment, a social networking system may compute affinity scores for users' interests either explicitly expressed or otherwise inferred on the social networking system and use these affinity scores in ranking new content items that will be published in news feeds, or communication channels on the social networking system, for the users. News feed rankings based on affinity scores are further discussed in related applications, "Adaptive Ranking of News Feed in Social Networks," U.S. application Ser. No. 13/194,770, filed on Jul. 29, 2011 and "Ranking Newsfeed Based on Social Graph Information," U.S. application Ser. No. 13/194,773, filed on Jul. 29, 2011, both which are hereby incorporated by reference.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "Justin Bieber." Each of the interactions with an object may be recorded by the social networking system as an edge. By enabling advertisers to target their advertisements based on user interactions with objects related to a keyword, the advertisements may reach a more receptive audience because the users have already performed an action that is related to the advertisement. For example, a merchandiser that sells Justin Bieber t-shirts, hats, and accessories may target ads for new merchandise to users that have recently performed one of multiple different types of actions, such as listening to Justin Bieber's song "Baby," purchasing Justin Bieber's new fragrance, "Someday," commenting on a fan page for Justin Bieber, and attending an event on a social networking system for the launch of a new Justin Bieber concert tour. Enabling third-party developers to define custom object types and custom action types is further described in a related application, "Structured Objects and Actions on a Social Networking System," U.S. application Ser. No. 13/239,340 filed on Sep. 21, 2011, which is hereby incorporated by reference.

Even though a social networking system may collect, and in some cases infer, information about its users, significant resources must be expended to organize the staggering amounts of data collected. A social networking system having hundreds of millions of users, for example, gathers and infers a staggering amount of information about its users. To address issues of scalability and efficiently expending computing resources, a social networking system provides a snapshot of databases for modules to process. Recent changes in a user's personal life, such as an engagement, birth of a child, moving across the country, graduating from college, and starting a new job, can be collected and inferred from these snapshots on social networking systems. Content items related to these life events may be prioritized in a ranking of news feed stories selectively provided to users to ensure that the most relevant information is consumed first, in one embodiment.

As users accumulate more connections on a social networking system, news feeds, or the communication channels used by the social networking system to communicate content posted by the users' connections, have the potential to become inundated and clogged with irrelevant information. Ranking content items according to users' interests and affinities for other users may help to mitigate this problem. However, a social networking system may be unable to determine whether users that engage with the social networking system often, even multiple times a day with different devices associated with the same user profile, have finished viewing the content items already provided. Often times, a user may load a web page on the social networking system and inadvertently overlook a particularly engaging content item posted by another user connected to the user. This leads to less user engagement on the social networking system.

Social networking systems strive to keep their users engaged by delivering relevant content as soon as users are able to consume the content. Determining whether users are ready to view more content, especially as users accumulate hundreds and even thousands of "friends" on the social networking system, is valuable to ensuring that users remain engaged with the social networking system without inundating their newsfeeds with irrelevant content. Machine learning and heuristics analysis may be used in selectively providing content to users of a social networking system.

FIG. 1 illustrates a high level block diagram of a process for selectively providing content to users of a social networking system, in one embodiment. The social networking system 100 uses different types of information about users in the process of selectively providing content to users, including user profile objects 102, an action log 104, and edge objects 106. Each user of the social networking system 100 is associated with a specific user profile object 102. These user profile objects 102 include declarative information about the user that was explicitly shared by the user as well as any profile information inferred by the social networking system 100. In one embodiment, a user profile object 102 may include thirty or more different data fields, each data field describing an attribute of the corresponding user of the social networking system 100.

Users of the social networking system 100 may take actions using the social networking system 100 that are associated with one or more objects. Information describing these actions is stored in the action log 104. The action log 104 includes many different types of interactions that occur on a social networking system, including commenting on a photo album, communications between users, becoming a fan of a musician, and adding an event to a calendar. Additionally, the action log 104 records a user's interactions with advertisements on the social networking system 100 as well as other applications operating on the social networking system 100.

Edge objects 106 store information about users' connections to other nodes on a social networking system 100. Such information may include the interactions between the user and the connection on the social networking system 100, including wall posts, comments on photos, geographic places where they have been tagged together, and photos in which they have both been tagged in. In one embodiment, an edge object 106 includes information about the strength of the connection between the users, such as an affinity score. If a user has a high affinity score for a particular connection, the social networking system 100 has recognized that the user interacts highly with that connection. Affinity scores and methods of gathering this social data from a social networking system are described further in "Contextually Relevant Affinity Prediction in a Social Networking System," U.S. application Ser. No. 12/978,265, filed on Dec. 23, 2010, which is hereby incorporated by reference.

A viewing user device 108 may connect with the social networking system 100 and request content in a news feed user interface 118. A news feed manager 110 responds to the request from the viewing user device 108 by first determining previously presented news feed stories 116 for the user associated with the viewing user device 108. Incoming news feed stories 112 for the user associated with the viewing user device 108 are determined and then ranked by a news feed ranking module 114. The top incoming news feed stories 112 may be selected by the news feed manager 110 and displayed in the news feed above the remaining incoming news feed stories 112. The news feed ranking module 114 may use information about the user associated with the viewing user device 108 to determine the ranking of content items in the news feed for the user. This user information may be obtained from user profile objects 102, edge objects 106, and actions stored in the action log 104 associated with the user.

The news feed manager 110 may then provide previously presented news feed stories 116 below the incoming news feed stories 112 for rendering in the news feed user interface 118 based on received user input that indicates the user has finished consuming the previously presented news feed stories 116. As a result, the viewing user will see the top new news stories first, followed by the remaining new news stories, and then the previously presented news feed stories. Such user input may include clicking on, or otherwise selecting, a link in the news feed user interface 118 for more news stories, detecting a scroll action from the viewing user device 108, receiving clicking actions on various content items in news feed user interface 118, and an elapsed time spent on the news feed user interface 118 after loading the news feed user interface 118 on the viewing user device 108.

The news feed manager 110 records, for each user on the social networking system 100, a "view state" of the news feed stories that have been presented in each user's news feed, storing the order of the stories that have been presented. The view state at a particular time may be stored in a view state object 120 associated with the user. Using this view state, the news feed manager 110 may determine whether news feed stories have evolved, changing the ranking of the news feed stories. For example, a viewing user may be connected to another user that shared a link about a news story about Christmas shopping. The viewing user may express interest in this link by sharing the news story with other users connected to the viewing user, commenting on the news story, or "liking" the news story. Later, other users connected to the viewing user may further interact with the news story or may post other news stories related to the topic of the news story about Christmas. The news feed ranking module 114 may rank the news story higher as a result of users with high affinities interacting with the news feed story. Because these interactions have evolved the previously presented news story 116, the news story may be presented to the viewing user as an incoming news feed story 112 by the news feed manager 110. In addition, the news feed manager 110 may cluster the news feed stories about Christmas into one news feed story, showing the newer interactions by other users.

The news feed manager 110 may, in one embodiment, use machine learning methods to selectively provide new content to users of the social networking system 100. Each user on the social networking system 100 may have different affinities for other users on the social networking system 100, interests and concepts embodied as nodes on the social graph of the social networking system 100, and applications that may be installed on the social networking system 100. Content items produced by these users, interests, concepts, and applications have the potential to flood users with irrelevant information, effectively hiding more relevant items. Machine learning may be used to predict which content items are more relevant for users as well as when users may be ready to consume new content items by analyzing user behaviors on the social networking system.

As a viewing user device 108 loads a news feed user interface 118, the news feed manager 110 may render a link in the news feed user interface 118 to indicate a number of new stories that have been accumulated. In this way, the user may read and/or consume top news stories that have been posted since the last time the user logged in. In one embodiment, the news feed manager 110 may determine that the user associated with the viewing user device 108 is actively engaged with the news feed interface 118 and may automatically update the news feed user interface 118 with top incoming news feed stories 112 as ranked by the news feed ranking module 114. In another embodiment, the news feed manager 110 may determine that a top incoming news feed story 112 warrants automatically updating the news feed user interface 118 for the user based on past user behaviors. In a further embodiment, the news feed manager 110 may update the link in the news feed user interface 118 to indicate an updated number of new stories that have been accumulated and await user input, such as a mouse click, a touchpad input, voice input, gesture input, or keyboard input, to execute the link and display the new incoming news feed stories 112. A "click" action may be defined as any user input used to select and execute a link.

In one embodiment, the news feed manager 110 may dynamically render the previously presented news feed stories 116 and incoming news feed stories 112 in a ranking determined by the news feed ranking module 114 based on user input received, or lack of receipt, from the news feed user interface 118 on the viewing user device 108. For example, a user may access a social networking system 100 through a viewing user device 108 in the morning and browse through content items that are provided in the news feed user interface 118. Once provided in the news feed user interface 118, the order of the previously presented news feed stories 116 is stored as the user's view state at that time in a view state object 120 associated with the viewing user. The user may then browse on other sites on the viewing user device 108 and leave the news feed user interface 118 open, where the news feed user interface 118 is embodied on a web page loaded by a web browser or on a native application on a mobile device. Later that afternoon, the user may again access the social networking system 100 through the viewing user device 108 to either continue browsing previously presented news feed stories 116 or new incoming news feed stories 112. As described above, the news feed manager 110 may render a link in the news feed user interface 118 to indicate that incoming news feed stories 112 are available. The user may click on the link to view the new incoming news feed stories 112. This user input may cause the news feed manager 110 to provide for display in the news feed user interface 118 the incoming news feed stories 112 as ranked by the news feed ranking module 114 above the previously presented news feed stories in the order stored in the user's view state that morning retrieved from the view state object 120 associated with the user.

Alternatively, the user may never click on that link to display the incoming news feed stories 112. In that case, the news feed manager 110 may continue holding the incoming news feed stories 112 while refreshing the link that indicates an increasing amount of new stories. On the other hand, the news feed manager 110 may automatically refresh the news feed user interface 118 to display the incoming news feed stories 112 with the previously presented news feed stories 116. In one embodiment, the news feed ranking module 114 may rank a new incoming news feed story 112 below a previously presented news feed story 116 because the previously presented news feed story 116 may have been highly interacted with by other users connected to the viewing user, may have evolved by the original publishing user commented on the previously presented news feed story 116, or may be of high interest to multiple users connected to the viewing user. As a result, the incoming news feed stories are selectively provided to the viewing user based on information gathered about that user as well as the view state of the news feed for that user.

System Architecture

Figure 2:
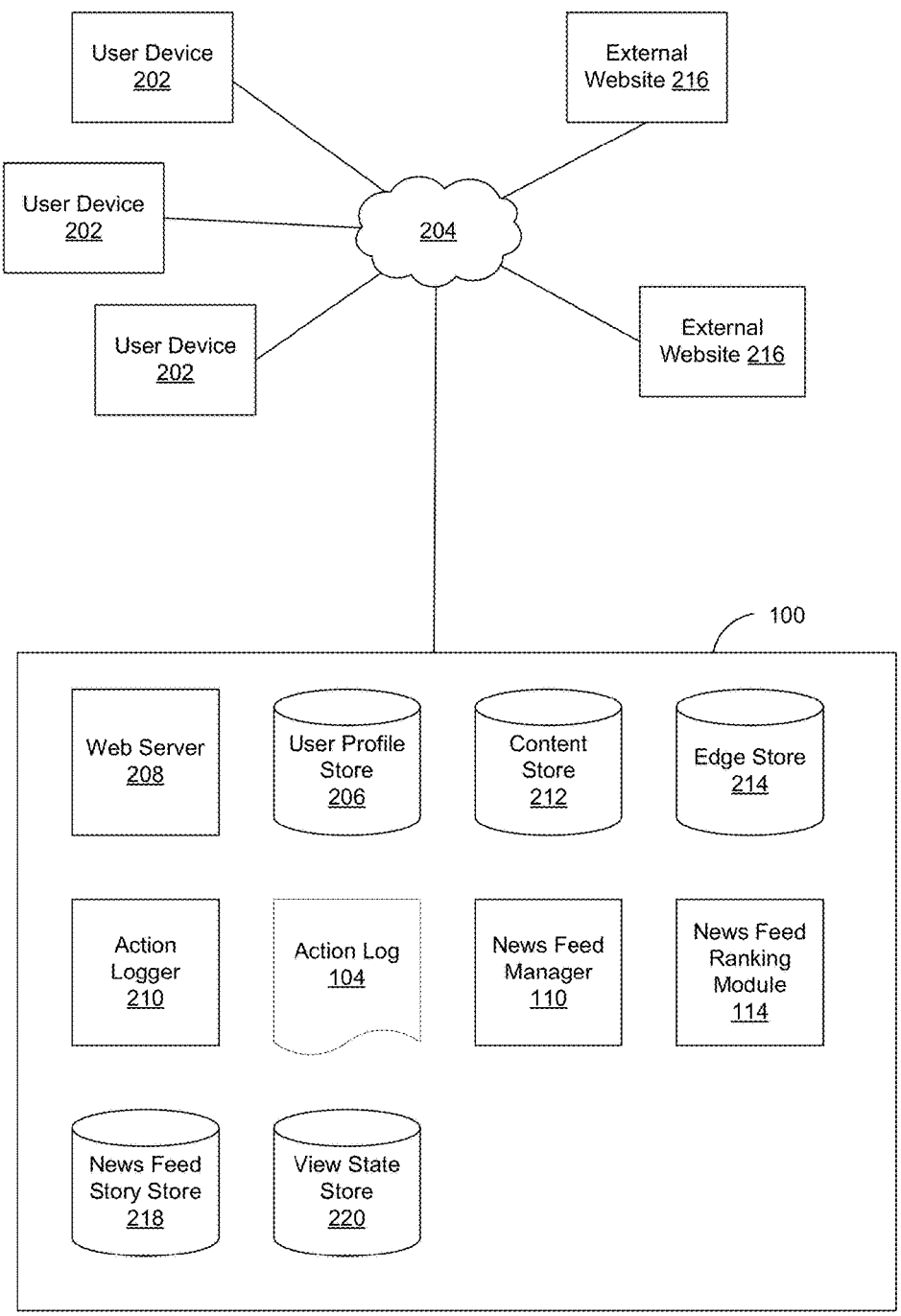
FIG. 2 is a network diagram of a system for selectively providing content in a social networking system, showing a block diagram of the social networking system, in accordance with an embodiment of the invention.

FIG. 2 is a high level block diagram illustrating a system environment suitable for selectively providing content to users of a social networking system, in accordance with an embodiment of the invention. The system environment comprises one or more user devices 202, the social networking system 100, a network 204, and external website 216. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, an action logger 210, an action log 104, a content store 212, an edge store 214, a news feed manager 110, a news feed ranking module 114, a news feed story store 218, and a view state store 220. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

The action logger 210 is capable of receiving communications from the web server 208 about user actions on and/or off the social networking system 100. The action logger 210 populates the action log 104 with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well. These actions are stored in an action log 104.

An action log 104 may be used by a social networking system 100 to track users' actions on the social networking system 100 as well as external websites that communication information back to the social networking system 100. As mentioned above, users may interact with various objects on the social networking system 100, including commenting on posts, sharing links, and checking-in to physical locations via a mobile device. The action log 104 may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log 104 records data about these users, including viewing histories, advertisements that were clicked on, purchasing activity, and buying patterns.

User account information and other related information for users are stored as user profile objects 108 in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 212.

The edge store 214 stores the information describing connections between users and other objects on the social networking system 100 in edge objects 110. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 214, in one embodiment. For example, a user that plays multiple songs from Lady Gaga's album, "Born This Way," may have multiple edge objects for the songs, but only one edge object for Lady Gaga.

A news feed manager 110 selectively provides content to users of a social networking system 100 and records the consumption of content by users using view state objects 120 for the users of the social networking system 100. View state objects 120 are stored in the view state store 220 and are associated with user profile objects 102 stored in the user profile store 206. As new news feed stories are generated for a user by the news feed manager 110, the news feed stories are ranked by the news feed ranking module 114 and stored in the news feed story store 218. The news feed manager 110 may communicate with user devices 202 through the web server 208 and network 204 to provide content to users of the social networking system 100. In one embodiment, a news feed manager 110 may provide content through a social plug-in, such as an iFrame, to an external website 216 to provide content posted on the social networking system 100 about an entity associated with the external website 216. As an example, a business entity that creates a page on the social networking system 100 may desire to publish the content items posted on the page's news feed in the social networking system to an external website 216 via a social plug-in installed on the external website 216.

Selecting Content to Provide to Users of a Social Networking System

Figure 3:
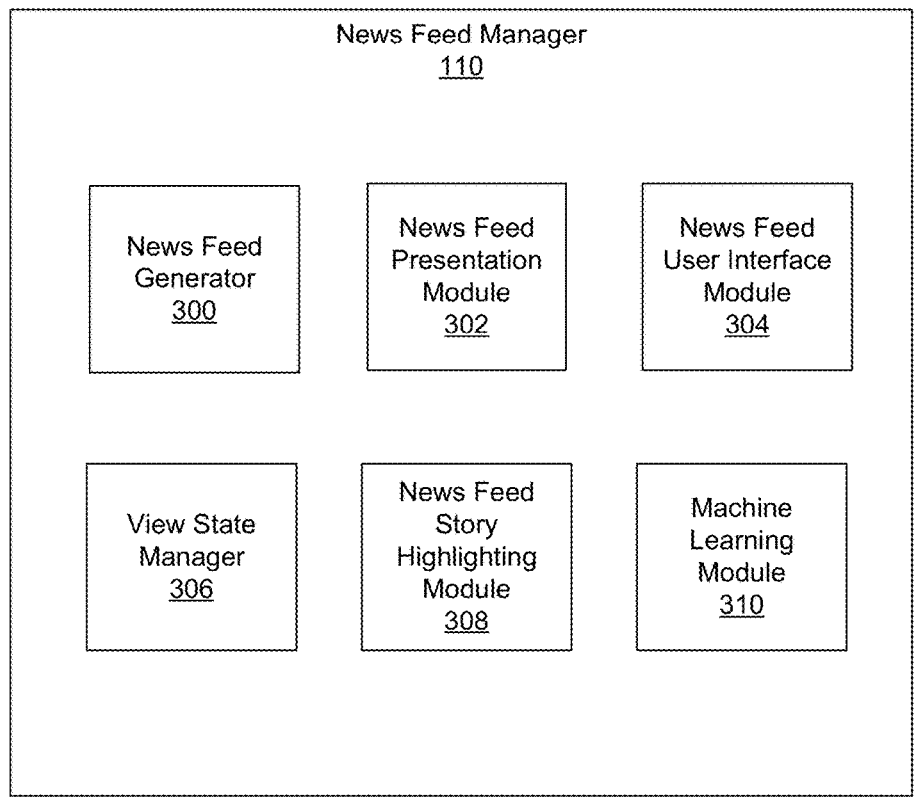
FIG. 3 is high level block diagram illustrating a news feed manager that includes various modules for managing content provided to users of a social networking system, in accordance with an embodiment of the invention.

FIG. 3 illustrates a high level block diagram of the news feed manager 110 in further detail, in one embodiment. The news feed manager 110 provides the functionality for managing activities related to news feed including, generating the news feed stories, selecting the news feed stories for presentation to users of the social networking system 100, retrieving a ranking of the news feed stories identified for presentation to a user, and presenting the news feed stories via the news feed user interface 118. A news feed story may describe objects represented in the social networking system, for example, an image, a video, a comment from a user, status messages, external links, content generated by the social networking system, applications, games, or user profile. The news feed manager 110 includes a news feed generator 300, a news feed presentation module 302, a news feed user interface module 304, a view state manager 306, a news feed story highlighting module 308, and a machine learning module 310. These modules may perform in conjunction with each other or independently to selectively provide content to users of a social networking system 100.

The news feed generator 300 module generates news feed stories for presentation to users of the social networking system 100. The user to whom a news feed story is presented is referred to as a viewer of the news feed story. In an embodiment, the news feed generator 304 analyzes information stored in the action log 104 to identify information useful for generating news feed stories. The news feed generator 300 identifies actions stored in action log 104 that are likely to be of interest to viewers and extracts information describing these actions from the action log 104 to generate incoming news feed stories 112. Alternatively, the news feed generator 300 can obtain information describing actions from other modules, for example, from the action logger 210, or other run time modules that implement functionality for performing different types of actions. For example, if a user uploads an image to the social networking system 100, the module executing the code for uploading the image can inform the news feed generator 300 of the action so that the news feed generator 300 can generate a news feed story describing the action.

The news feed generator 300 may determine that certain actions are not likely to be of interest to users for reporting as incoming news feed stories 112. For example, a user hiding a comment posted by another user or a user changing certain types of user preferences may not be of interest to other users and is therefore not reported in news feed stories. However, other changes made by a user to the user's profile may be considered interesting for other users, for example, a change in relationship status of a user. The news feed generator 300 may not generate news feed stories based on certain actions as a matter of policies enforced by the social networking system 100. For example, a user viewing user profile of another user or a user sending a private message to another user may not be presented as news feed stories due to privacy concerns. Furthermore, the news feed generator 300 may consider privacy settings of individual users to determine whether certain actions of a user can be presented as news feed stories to other users. A user may set the user's privacy settings to limit the set of people to whom news feed stories describing the user's actions may be sent. For example, a user may allow only connections of the user to receive information describing the users' actions, whereas another user may allow connections of the user's connections to receive the information. A user may restrict the types of actions that are reported as news feed stories. For example, the user may specify that certain actions, for example, adding a new connection may not be reported as news feed stories.

In an embodiment, the news feed generator 300 stores generated news feed stories in the news feed story store 218. The news feed story store 218 may be represented as a database that links various objects related to the news feed stories. Each news feed story stored in the news feed story store 218 can be associated with other entities in the social networking system 100. For example, a news feed story may be associated with one or more users that performed an action described in the news feed story as well as with a representation of the video in the social networking system 100. The users that performed the actions described in the news feed story are called the actors. For example, if the news feed story describes a comment posted by John on a video posted by Jack, both John and Jack can be considered actors of the news feed story. As another example, a news feed story describing a comment posted by a user in response to another user's wall post may be associated with both the user who posted the message on the wall and the user who posted the comment.

A news feed presentation module 302 provides generated content items, or news feed stories, for display on news feed user interfaces 118 on viewing user devices 108. The news feed presentation module 302 determines the news feed stories to be presented to a user and provides the stories selected for presentation to the news feed user interface module 304. The news feed user interface module 304 presents the selected news feed stories to the news feed user interface 118 on a viewing user device 108. The news feed presentation module 302 determines a set of stories for presentation to a viewer based on associations between the stories and the viewer. These associations are determined on various factors including, whether the story describes a user of the social networking system that is connected to the user, whether the viewer previously accessed information describing an entity represented in the social networking system that is described in the story, whether the viewer interacted with another story that is related to the current story, and the like. The news feed presentation module 302 uses the news feed ranking module 114 to rank the news feed stories being presented to the user.

The news feed presentation module 302 may present a subset of the stories based on the rank, for example, the top 10 stories, depending on the display area available on the news feed user interface 118 for presenting the stories. The news feed presentation module 302 presents the stories in the order determined by the ranking, for example, stories ranked higher may be presented more prominently compared to stories ranked lower. In an embodiment, the stories ranked higher are presented above the stories ranked lower. In a further embodiment, the remaining incoming news stories not selected as the "top" news stories may be presented in a chronological order after the top news stories. In other embodiments, stories ranked higher may be presented more prominently by displaying them using an appropriate text color, font, text size, back ground color, etc.

A view state manager 306 operates independently and asynchronously from the other modules in the news feed manager 110. The view state manager 306 determines when to capture a view state of the news feed for each user of a social networking system 100. A viewing user may login to a social networking system 100 to start a new viewing session. Throughout the session, incoming news feed stories 112 may be provided to a viewing user, and as a result, the view state for the viewing user has changed. The view state manager 306 may determine that, after each news feed story is published to a user's news feed, the view state should be updated in the view state object 120. The view state object 120 is stored in a view state store 220 which may be embodied in super fast memory, in one embodiment. In one embodiment, the view state is updated when a user's session expires. The session may expire based on a lack of engagement with or activity on the social networking system 100 by the user. For example, a user may open a web browser on a user device 202 to connect to the social networking system 100. After browsing news feed stories, the user may open another browser window to view other web pages not connected to the social networking system 100. In one embodiment, the session created when the user first connected with the social networking system 100 will expire based on a predetermined time period of non-activity elapsing. In another embodiment, the viewing session expires when the user logs out of the social networking system 100. When a session expires, the view state, which includes an order of news feed stories and indications of whether news feed stories were featured or highlighted as a top story, is stored in the view state object 120 associated with the user.

Using the view state manager 306, the news feed manager 110 may determine that the user is not yet ready to read or consume more news feed stories. For example, if a user starts a new session but does not scroll down the news feed, as detected by the news feed user interface module 304, then the news feed manager 110 may assume that the user has not yet read the news feed stories provided on the news feed user interface. If that user later starts another session, the previously presented news feed stories 116 remain frozen on the news feed user interface using the view state previously stored by the view state manager 306. A link may be rendered by the news feed user interface module 304 to indicate that incoming news feed stories 112, generated by the news feed generator 300 and ranked by the news feed ranking module 114, are available for consumption without presenting the new incoming news feed stories 112. In one embodiment, the link includes a number of incoming news feed stories 112 that are available. This number may be dynamically updated in real-time as new news feed stories are generated by the news feed generator 300. In another embodiment, the news feed user interface module 304 may include a preview of the new incoming news feed stories 112 that are available for consumption without publishing the incoming news feed stories 112 and changing the view state.

In a further embodiment, the news feed manager 110 may infer that a user has finished consuming or reading the news feed stories that are presented upon loading the news feed user interface on a user device 202. In that case, the incoming news feed stories 112 may be automatically rendered and presented by the news feed presentation module 302 upon creation by the news feed generator 300 and ranking by the news feed ranking module 114. The view state would also be updated by the view state manager 306. In yet another embodiment, the news feed manager 110 may hold the incoming news feed stories 112 behind a link rendered by the news feed user interface module 304 unless or until a top story has been generated by the news feed generator 300 and ranked by the news feed ranking module 114. The top new news story may have a prediction score, determined by the news feed ranking module 114, that exceeds a predetermined threshold to cause the news feed manager 110 to publish the top news story without determining that the viewing user is ready to consume more news stories.

A news feed story highlighting module 308 selects news feed stories that have been highlighted by the news feed ranking module 114 as highly relevant stories for a viewing user. Highlighted stories may be displayed in a news feed more prominently above other news feed stories and may also be rendered in a different color or background to denote that the stories have been highlighted. The news feed story highlighting module 308 may also, in one embodiment, combine news feed stories that are about the same topic or refer to the same link. For example, the news feed story highlighting module 308 may analyze keywords that are included in content items that posted on the social networking system 100, such as "Christmas," and combine those news feed stories into a condensed news feed story that is highlighted for the viewing user to see on their news feed. This enables the viewing user to browse through a news feed more efficiently by combining redundant and similar posts. In another embodiment, a separate news feed process groups these redundant and similar posts into a single combined post and operates in conjunction with the news feed story highlighting module 308 to highlight the combined post on the news feed.

In one embodiment, the news feed story highlighting module 308 may include programmable logic, or instructions, to ensure that a news feed story that was posted by another user or entity connected to the viewing user is highlighted, based on the affinity score for that user. For example, if a viewing user is highly interested in news feed stories posted by another user on the social networking system 100, such as the viewing user's wife, based on user profile information, interactions with that user, as well as content posted by that user, then the news feed story highlighting module 308 may be configured to highlight all news feed stories published by that user. In one embodiment, a viewing user may interact with the news feed user interface to indicate that a news feed story should be highlighted. In doing so, the news feed story highlighting module 308 may better understand what types of news feed stories appeal to the viewing user. Similarly, the viewing user may indicate that a highlighted story should not be highlighted by interacting with the news feed user interface.

In another embodiment, the news feed story highlighting module 308 may generate a prediction model for each user on the social networking system 100 to predict which news feed stories should be highlighted based on a number of factors, including the authoring user of the news feed story, the topic of the news feed story, the type of content included in the news feed story, applications that have published the news feed story, reputation metrics of users that have published the news feed story, and a virality metric of the news feed story. A prediction model may, over time, adjust weights for these factors depending on user interactions that differ from user to user. Machine learning methods may be used to optimize the prediction models to be specific to each viewing user, in one embodiment. In this way, viewing users with differing affinities for different types of content items may have more personalized news feeds.

A machine learning module 310 may be used in the news feed manager 110 to refine the predictive models and select the predictive factors used for selecting highlighted news feed stories. In one embodiment, a social networking system 100 uses a machine learning algorithm to analyze user interactions with highlighted stories to retrain the predictive model. Using feedback from the user interactions indicating whether a news feed story should be highlighted, the predictive model may be refined to include more or less predictive factors and the weights assigned to each predictive factor, or coefficients, can also be adjusted based upon the response, i.e., the user interactions with the highlighted stories.

In another embodiment, the machine learning module 310 may be used to determine whether a previously presented news feed story, such as a shared link to a video, may evolve into a new incoming news feed story based on other users sharing the link, commenting on the link, or otherwise interacting with the link. For example, if a very close friend of a viewing user, as determined from an affinity score for the user profile object for the very close friend, shared the link that was previously presented on the viewing user's news feed, the previously presented news feed story may be combined into a single news feed story that includes the other users that have shared the link, including the very close friend and his comments about the link, if any. The machine learning module 310 may be used to determine, in conjunction with the news feed story highlighting module 308, whether such stories should evolve and be presented to the viewing user again.

Figure 4:
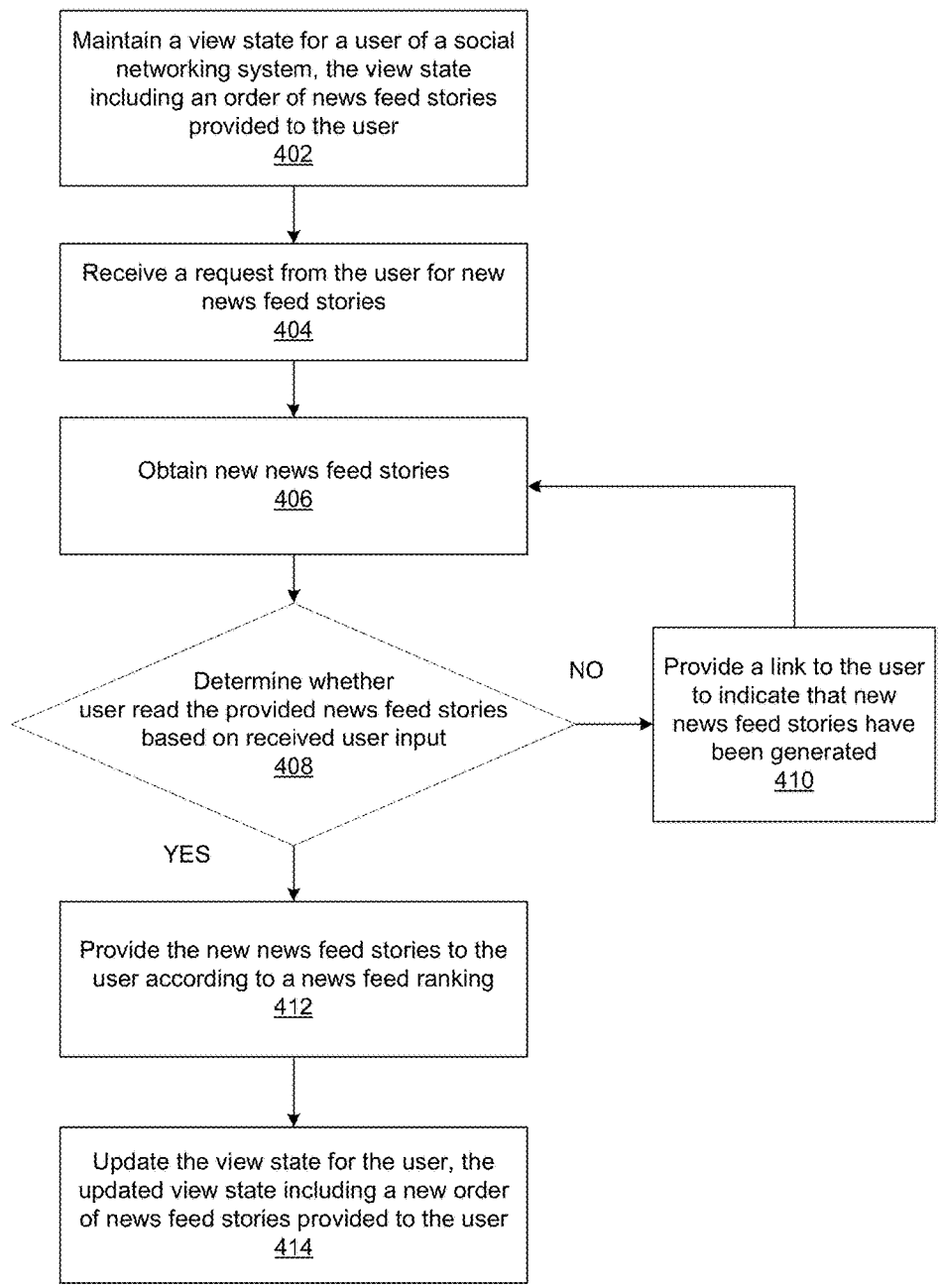
FIG. 4 is a flowchart of a process of selectively providing content to a viewing user of a social networking system, in accordance with an embodiment of the invention.

FIG. 4 illustrates a flow chart diagram depicting a process of selectively providing content to a viewing user of a social networking system, in accordance with an embodiment of the invention. A view state for a user of a social networking is maintained 402, where the view state includes an order of news feed stories provided to the user. The view state for a user may be stored in a view state object 120 associated with a user profile object 102 for the user each time new news feed stories are provided to the user. The view state may be maintained 402 over time to store the order in which news feed stories have been presented to the user, regardless of the user device on which the user interacts with the news feed stories.

A request for new news feed stories may be received 404 from the user. This request may be in the form of an application programming interface (API) call from a mobile device application that requests content for a news feed user interface on the user device, in one embodiment. In another embodiment, the request may be received 404 as a web page request for content in a news feed user interface on the browser window operating on the user device.

Once a request for new news feed stories has been received 404, new news feed stories are obtained 406. The news feed generator 300 in the news feed manager 110 may generate new news feed stories and hold them in a queue to be presented to the viewing user. The new news feed stories may be obtained from this queue, in one embodiment. In another embodiment, new news feed stories may be generated upon receiving 404 the request from the user. In a further embodiment, a news feed ranking module 114 may identify a top news feed story for the news feed story highlighting module 308. As a result, the top news feed story is obtained 406 as a new news feed story. This new news feed story may, in one embodiment, include a plurality of news feed stories that have been combined into a single news feed story. Remaining new news feed stories, other than the selected top news feed stories, are also obtained 406.

After new news feed stories are obtained 406, the social networking system 100 determines 408 whether the user read the provided news feed stories based on received user input. If the social networking system 100 determines 408 that the user has not read the provided news feed stories based on received user input, then a link is provided 410 to the user to indicate that new news feed stories have been generated and new news feed stories are continuously obtained 406. User input that may indicate whether the user has read the provided news feed stories includes a scroll action on a web browser or mobile application, a click action on a link provided in a news feed story, and a refresh of the user interface on the web browser or mobile application. In one embodiment, no user input is needed, and if the web browser is active or the mobile application is open, the social networking system 100 may determine 408 that the user has read the provided news feed stories. In another embodiment, the social networking system 100 determines 408 that the user has read the provided news feed stories based on a predetermined time period elapsing.

After the social networking system 100 has determined 408 that the user has read the provided news feed stories, the new news feed stories are provided 412 to the user according to a news feed ranking. The new news feed stories are ranked by the news feed ranking module 114 and may be highlighted by the news feed story highlighting module 308 in the news feed manager 110. In one embodiment, the new news feed stories are provided 412 to the user according to a prediction model generated by the news feed story highlighting module 308 based on previous user interactions on the social networking system 100. In another embodiment, the news feed ranking may change dynamically, based on newly generated news feed stories. In a further embodiment, the top new news feed stories are provided in ranked order, followed by the remaining new news feed stories in a chronological order, such as reverse chronological order.

After the new news feed stories are provided 412 to the user, the view state for the user is updated 414, such that the updated view state includes a new order of the news feed stories provided to the user. The updated view state is stored in the view state object 120 associated with the user profile object 102 for the viewing user. The view state is used by the social networking system 100 to determine 408 whether the user has read the provided news feed stories, in one embodiment.

Figure 5A:
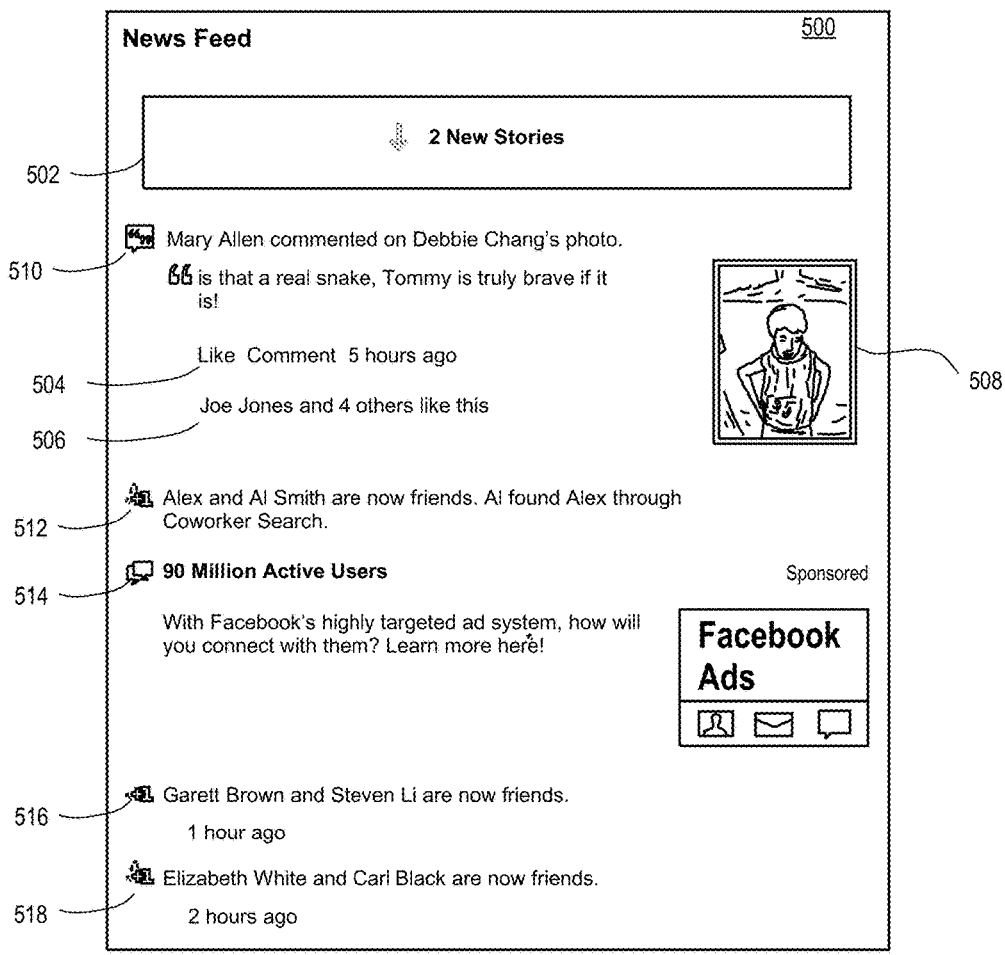
FIGS. 5A and 5B are examples of a user interface of a process of selectively providing content to a viewing user of a social networking system, in accordance with an embodiment of the invention.
Figure 5B:
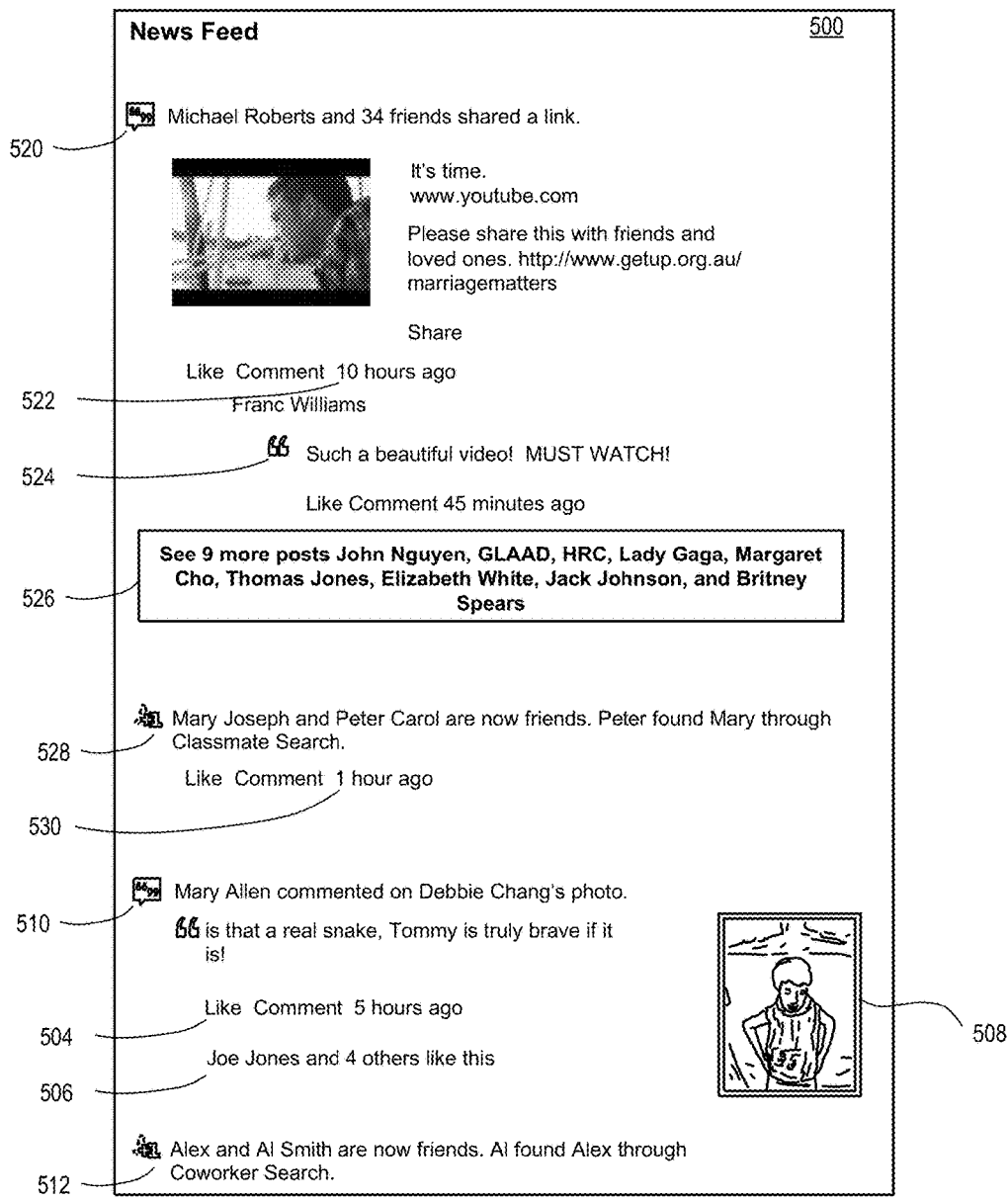

FIGS. 5A and 5B are examples of a user interface of a process of selectively providing content to a viewing user of a social networking system, in accordance with an embodiment of the invention. In FIG. 5A, the user interface provides a news feed 500 to a viewing user of the social networking system. The news feed 500 includes a plurality of news feed stories, including a news feed story 510 about Mary Allen commenting on Debbie Chang's photo 508, a news feed story 512 indicating a new connection was formed between users Alex and Al Smith, an advertisement 514, a news feed story 516 indicating a new connection was formed between users Garrett Brown and Steven Li, and a news feed story 518 indicating a new connection was formed between users Elizabeth White and Carl Black. The news feed story 510 includes links 504 for the viewing user to interact with the news feed story 510, including expressing approval of the news feed story 510 by "liking" it and commenting on the news feed story 510. The news feed story 510 also includes a social indicator 506 of other users that expressed interest in the news feed story 510.

The news feed 500 illustrated in FIG. 5A also includes an incoming news feed stories link 502 that indicates to the viewing user that there are additional news feed stories that are ready to be presented. As shown in FIG. 5A, there are "2 New Stories" available to be presented to the viewing user as described in the incoming news feed stories link 502. Over time, as more new incoming news feed stories are generated by the news feed generator 300, the number of new stories available in the incoming news feed stories link 502 will increase. In one embodiment, the new incoming news feed stories will not be presented to the viewing user until the viewing user clicks on the incoming news feed stories link 502. In another embodiment, the new incoming news feed stories are presented to the viewing user after a predetermined time period elapses. In yet another embodiment, the new incoming news feed stories are presented to the viewing user if there is a highly relevant news feed story, as determined by the news feed story highlighting module 308 in the news feed manager 110. In a further embodiment, new incoming news feed stories are presented to the viewing user without the incoming news feed stories link 502 being rendered. In that embodiment, new incoming news feed stories are presented to the viewing user upon generation.

In FIG. 5B, the user interface includes a news feed 500 that includes the new incoming news feed stories. In one embodiment, the viewing user has click on the incoming news feed stories link 502 illustrated in FIG. 5A, resulting in the presentation for display in the news feed 500 of a news feed story 520 about a link to a video on an external website shared by user Michael Roberts and 34 other users connected to the viewing user and a news feed story 528 indicating a new connection was formed between users Mary Joseph and Peter Carol. The news feed story 520 includes a time indicator 522 of when the link was first shared with the viewing user, 10 hours ago. The news feed story 520 also includes a recent comment on the link by another user of the social networking system that further includes a time indicator of when the comment was made, 45 minutes ago. Finally, the news feed story 520 includes a grouping link 526 that indicates information about other users connected to the viewing user that have also shared the link. Upon clicking the grouping link 526, the comments of the other users are presented in the news feed 500 within the news feed story 520.

The news feed story 528 also includes a time indicator 530 of when the new connection was formed, 1 hour ago. As illustrated in FIG. 5B, the news feed story 520 that comprises a combined post of multiple posts sharing the same link was first shared with the viewing user 10 hours ago, and yet the news feed story 520 is presented above the news feed story 528 which was completed an hour ago. In one embodiment, the news feed story highlighting module 308 may have placed the news feed story 520 about the shared link to an external video above the news feed story 528 about the formation of a new connection between other users of the social networking system because of the type of content included in the news feed story 520. The viewing user may be more interested in viewing shared links to external videos. In another embodiment, the news feed story highlighting module 308 may have placed the news feed story 520 about the shared link to an external video above the news feed story 528 because of the user Franc Williams's comment 524 on the shared link that was completed only 45 minutes ago. Because of the new comment from user Franc Williams, the news feed story 520 may have evolved into a new incoming news feed story as determined by the news feed story highlighting module 308. In yet another embodiment, if the viewing user did not have a preference of the content type of the news feed story 520 about the shared link to an external video, then the recent comment 524 from user Franc Williams made the news feed story 520 more relevant to the viewing user than the later formation of a connection between other users of the social networking system 100.

The new incoming news feed stories 520 and 528 appear above the previously presented news feed stories 510 and 512 within the news feed 500. In one embodiment, the incoming news feed stories 520 and 528 are dynamically rendered in the news feed 500 upon the viewing user clicking on the link 502 as illustrated in FIG. 5A. In another embodiment, the incoming news feed stories 520 and 528 are automatically rendered in the news feed 500 upon generation by the news feed generator 300 in the news feed manager 110. In yet another embodiment, the incoming news feed stories 520 and 528 may be presented to the viewing user in the news feed 500 even if the viewing user does not click on the link 502 because the news feed manager 110 determines that the incoming news feed stories 520 and 528 are of such relevance that the viewing user would want to view the incoming news feed stories 520 and 528. In a further embodiment, the incoming news feed stories 520 and 528 are dynamically rendered in the news feed 500 because the news feed manager 110 detects that the viewing user is actively engaged with the user interface that includes the news feed 500, such as detecting a scroll action, a click action on links within the news feed 500, or an active browser window or mobile application. In an alternative embodiment, the incoming news feed stories 520 and 528 are dynamically rendered in the news feed 500 upon the lapse of a predetermined time period.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
   displaying, in a dynamic news feed user interface, a first plurality of news stories, the first plurality of news stories communicate to a viewing user of a social networking system a plurality of actions performed by other users of the social networking system connected to the user;
   while displaying the first plurality of news stories during a viewing session of the viewing user, displaying a link indicating a count of new news stories available for consumption by the viewing user based on activities that occurred since the viewing session of the viewing user began;
   receiving user input requesting display of the new news stories in response to selection with an input device of the link indicating the count of new news stories available for consumption;
   in response to receiving the user input:
      obtaining a second plurality of news stories comprising the new news stories based on the activities that occurred since the viewing session of the viewing user began;
      ranking the new news stories based on relevance to the viewing user; and
      displaying an updated dynamic news feed to the viewing user, where the updated news feed comprises a ranked list of the new news stories displayed above a subset of the first plurality of news stories.

2. The method of claim 1, wherein obtaining the second plurality of news stories comprising new news stories based on activities that occurred since the viewing session of a viewing user of a social networking system further comprises:
retrieving a plurality of activities performed by a plurality of users connected to the viewing user on the social networking system after the viewing session of the viewing user; and
generating new news stories from the retrieved plurality of activities by the plurality of users connected to the viewing user.

3. The method of claim 1, wherein obtaining the second plurality of news stories comprising new news stories based on activities that occurred since a viewing session of a viewing user of a social networking system further comprises:
retrieving a plurality of activities performed by a plurality of users connected to the viewing user on the social networking system after the viewing session of the viewing user;
determining that a first activity of the plurality of activities was performed on a previously presented news feed story comprising a second activity performed by another user connected to the viewing user that was already provided for display to the viewing user; and
generating a new news story comprising the first activity and the second activity.

4. The method of claim 1, wherein the viewing session of a viewing user of a social networking system comprises a time period in which the viewing user most recently performed an activity on the social networking system.

5. The method of claim 1, wherein the viewing session of a viewing user of a social networking system starts upon the viewing user logging into the social networking system.

6. The method of claim 1, wherein the viewing session of a viewing user of a social networking system ends upon the viewing user logging off of the social networking system.

7. The method of claim 1, wherein the viewing session of a viewing user of a social networking system starts upon the viewing user performing an activity on the social networking system.

8. The method of claim 1, wherein the viewing session of a viewing user of a social networking system ends upon the viewing user becoming inactive on the social networking system.

9. The method of claim 1, wherein ranking the new news stories based on relevance to the viewing user further comprises:
defining a prediction model by selecting predictive factors based on received information about the viewing user; and
refining the prediction model based on user feedback regarding at least one top news feed story selected by the prediction model.

10. The method of claim 9, wherein a predictive factor in the prediction model comprises a topic for which the viewing user has an affinity.

11. The method of claim 9, wherein a predictive factor in the prediction model comprises a type of content for which the viewing user has an affinity.

12. The method of claim 9, wherein a predictive factor in the prediction model comprises an application for which the viewing user has an affinity.

13. The method of claim 9, wherein a predictive factor in the prediction model comprises a reputation metric of a publishing entity.

14. The method of claim 9, wherein a predictive factor in the prediction model comprises a virality metric of a potential top news feed story.

15. The method of claim 9, wherein the received information about the viewing user of the social networking system includes a plurality of affinity scores for other entities in the social networking system.

16. The method of claim 9, wherein the received information about the viewing user of the social networking system includes social graph information about other users connected to the viewing user in the social networking system.

17. The method of claim 1, further comprising:
selecting a set of top news stories from the new news stories based on the ranking by
selecting a predetermined percentage of new news stories based on the ranking as the set of top news stories.

18. The method of claim 1, further comprising:
selecting a set of top news stories from the new news stories based on the ranking by
selecting at least one new news story having a score greater than a predetermined threshold based on the ranking for inclusion in the set of top news stories.

19. The method of claim 17, wherein displaying a news feed to the viewing user further comprises:
displaying the set of top news stories in the news feed based on the ranking.

20. The method of claim 17, wherein displaying a news feed to the viewing user further comprises:
displaying the set of top news stories in the news feed;
responsive to displaying the set of top news stories in the news feed to the viewing user, displaying the remainder of the new news stories in reverse chronological order in the news feed to the viewing user; and
responsive to displaying the remainder of the new news stories in reverse chronological order, displaying the plurality of previously presented news feed stories in the news feed to the viewing user.

* * * * *